United States Patent [19]
Glorioso

[11] Patent Number: 4,953,478
[45] Date of Patent: * Sep. 4, 1990

[54] ODOR CONTROL FOR A SLUDGE TREATMENT PROCESS

[75] Inventor: John D. Glorioso, Clearwater, Fla.

[73] Assignee: Enviro-Gro Technologies, Baltimore, Md.

[*] Notice: The portion of the term of this patent subsequent to Aug. 29, 2006 has been disclaimed.

[21] Appl. No.: 350,059

[22] Filed: May 9, 1989

Related U.S. Application Data

[60] Division of Ser. No. 220,207, Jul. 18, 1988, Pat. No. 4,860,671, which is a continuation-in-part of Ser. No. 924,630, Oct. 29, 1986, Pat. No. 4,761,893.

[51] Int. Cl.⁵ .................................................. F23J 15/00
[52] U.S. Cl. ....................................... 110/215; 110/238; 34/11; 34/14
[58] Field of Search ................. 34/9, 11, 14, 35, 86, 34/95, 102; 432/197, 215; 110/215, 210, 236, 238

[56] References Cited

U.S. PATENT DOCUMENTS

| | | | |
|---|---|---|---|
| 3,410,233 | 11/1968 | Seiler | 34/11 |
| 3,707,774 | 1/1973 | Eise et al. | 34/14 |
| 3,864,841 | 2/1975 | McGehee | 34/11 |
| 3,963,471 | 6/1976 | Hampton | 34/11 |
| 4,040,190 | 8/1977 | Van Den Broeck | 34/11 |
| 4,130,945 | 12/1978 | Brachthause | 34/11 |
| 4,245,396 | 1/1981 | Maffet | 34/14 |
| 4,357,152 | 11/1982 | Duske et al. | 110/215 |
| 4,429,643 | 2/1984 | Mucholland | 110/215 |
| 4,558,525 | 12/1985 | Duske et al. | 34/128 |

Primary Examiner—Henry C. Yuen
Attorney, Agent, or Firm—Lowe, Price, LeBlanc, Becker & Shur

[57] ABSTRACT

A system is described for producing small uniform pellets of predetermined size which are substantially free of fines from mechanically dewatered sewage sludge and a means for controlling odor from the production of said pellets. The system includes a process and apparatus for mixing the dewatered sludge with previously dried recycled particles of said sludge. Drying the mixture in a thermal drier, separating a substantial portion of the dried solids from the drier off-gas. Clarifying said separated solids to separate the pellets of predetermined size, oversized pellets, and undersized pellets and particles, mechanically crushing the oversized pellets and admixing the crushed oversized pellets with the undersized pellets and particles and recycling said mixture for mixture with incoming dewatered sludge to the drier. The off-gas from the mechanical separation process is then passed through a condenser to remove some of the water therein, and is routed to an afterburner wherein it is burned. The off-gas from the afterburner then passes through a heat exchanger with fresh air to heat the fresh air which is then routed to the drier as combustion gas.

17 Claims, 3 Drawing Sheets

ODOR CONTROL FOR A SLUDGE TREATMENT PROCESS

This is a division, of application Ser. No. 07/220,207 filed Jul. 18, 1988, now U.S. Pat. No. 4,806,671, which is a continuation-in-part of my patent application entitled IMPROVED SLUDGE TREATMENT PROCESS Ser. No. 924,630 filed Oct. 29, 1986, the disclosure of which is hereby incorporated by reference.

BACKGROUND OF THE INVENTION

In my above identified parent patent application there is described a process for pelletizing sewage sludge to produce a product having pellets of uniform size which can be burned or used as a soil conditioner. In the latter case, uniform size pellets are very important so that the pellets may be used in conventional spreading equipment. The product produced by the parent process is essentially free of fines and free of oversized particles.

In the parent process, the sewage sludge is dewatered to produce a wet sludge cake. Previously pelletized particles and fines are then admixed with the wet sludge cake in a pug mill and the mixture passed through a dryer. The output from the dryer then proceeds to a separator can wherein solids are separated from the off-gas. The solids are then conveyed to a clarifier which separates undersized particles, which are routed to a recycle storage bin, product size pellets which are conveyed to a product storage bin for shipment or sale and oversized particles. The oversized particles are routed to a crusher and then the crushed particles are combined with the fines in a recycle bin for recycling.

The off-gas from the dryer and solid gas separator contains fines and some malodorous gases from the drying process. Typically the off-gas is passed through one or more cyclones to remove most of the fines. The gas is then typically conveyed through a wet scrubber, a packed tower and a chemical tower to remove the undesirable odors before being exhausted to the atmosphere.

It has been known that the dryer off-gas from a sludge incineration process could be used in the incinerator process. For example, in U.S. Pat. No. 4,215,637, a multiple hearth furnace is used for drying and incinerating sludge. Gas from the furnace is conveyed by conduit to an afterburner. Gas from the afterburner then passes through a heat exchanger wherein outside air is heated and the heated outside air is then introduced to the furnace as combustion gas.

Similarly, in U.S. Pat. No. 3,954,069 the drier off-gas after passing through a condenser is readmitted to the sludge incinerator. Also, in U.S. Pat. Nos. 4,153,411 and 4,429,643, the sludge is initially dried and the off-gas, after removal of some of the water therefrom is used in the incinerator.

As noted, the prior art patents all relate to incineration processes and do not describe a process for producing pelletized sludge for use for example as a soil conditioner.

SUMMARY OF THE INVENTION

It has been discovered however that my parent process can be modified by replacing the chemical tower with an afterburner. Off-gas from the dryer then passes through a condenser to remove some of the water therefrom and is subsequently burned in an afterburner. The heated off-gas from the afterburner then passes through a heat exchanger wherein fresh outside air is heated and then conveyed to the dryer. The fresh outside air can be mixed with a portion of the oxygen depleted off-gas from the afterburner in the heat exchanger. However, this gas is very humid even after passing through a condenser and a large percentage thereof cannot be reused in the dryer.

Accordingly, it is an object of this invention to provide an improved odor removal system for a sludge pelletizing process wherein the sludge is initially pelletized in a dryer and the dryer off-gas treated for odor removal by routing it through an afterburner. The heated off-gas from the afterburner is used in a heat exchanger to heat fresh outside air for use in the dryer.

It is another object of this invention to provide an improved sludge pelletizing process wherein a chemical tower for treatment of off-gases from the pelletizing process is replaced by an afterburner and a heat exchanger wherein the malodorous constituents of the off-gas are burned and a portion of the heat recaptured for reuse in the dryer.

BRIEF DESCRIPTION OF THE DRAWINGS

These and other objects will become readily apparent with reference to the drawings and following description wherein.

DETAILED DESCRIPTION OF THE INVENTION

Figure 3:
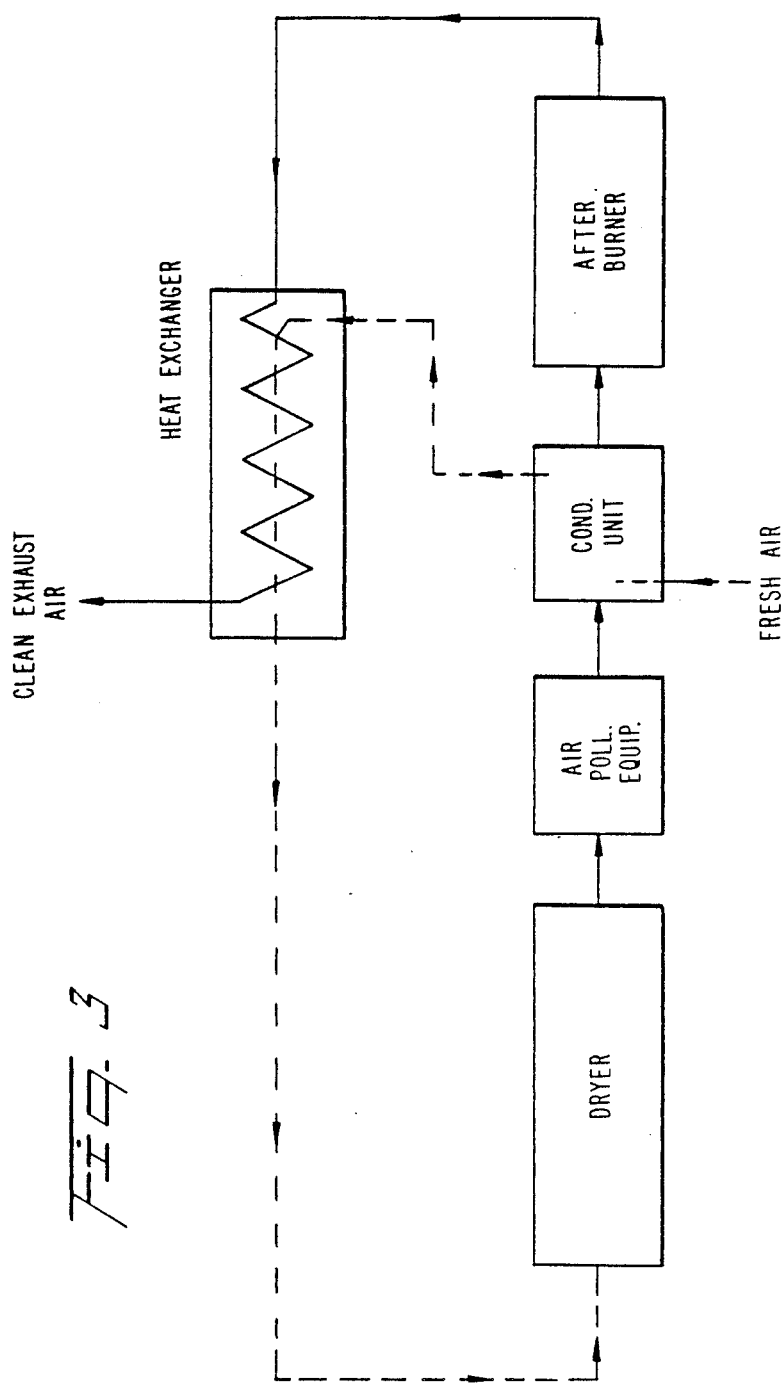
FIG. 3 is a schematic view of a simplified version of the process of this invention.

With attention to FIG. 3 the process of this invention in general routes the off-gas from dryer 4 to conventional air pollution control equipment which may include a scrubber 5. The gas then from the pollution equipment is routed to a condenser unit or heat exchanger 6 wherein some of the water is removed. The gas is then passed to the afterburner 7 where it is burned to remove odors, volatile constituents and hydrocarbons. The output from burner 7 is at a temperature of about 1400° F. These gases are ducted to a heat exchanger 8 wherein air from the condenser unit is heated by the afterburner gases from a temperature of about 160° F. up to about approximately 800° F. The heated fresh air is then routed into the dryer to provide combustion air.

Figure 1:
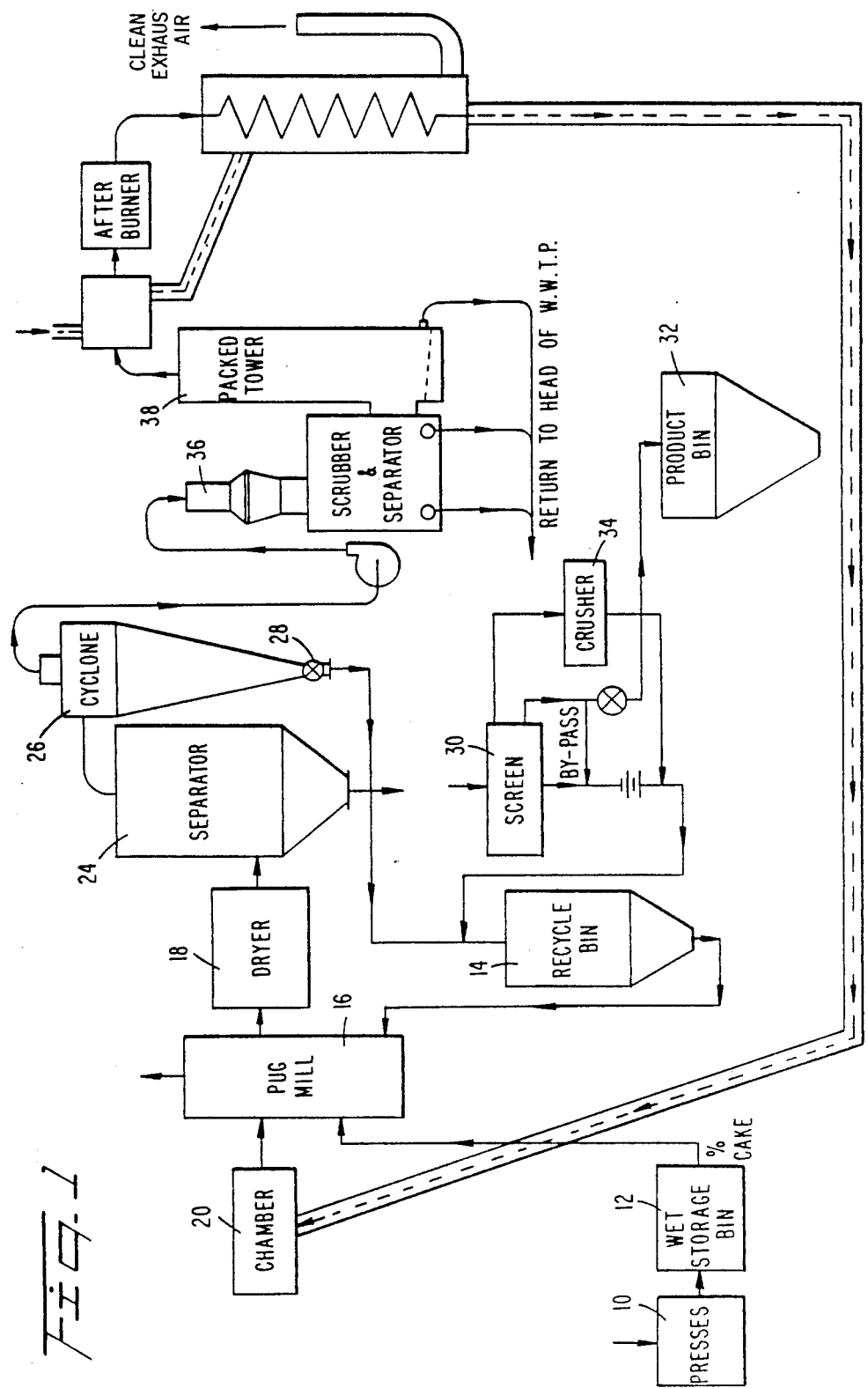
FIG. 1 is a detailed schematic of the system of this invention.

With attention to FIG. 1, liquid sewage sludge may contain up to 90–99% water According to conventional techniques, the sludge is subject to flocculation whereby sludge particles agglomerate so that when the liquid sewage sludge enters a mechanical press 10 it can be dewatered down to about 80% water and then routed to a storage bin 12. The material from bin 12 will be identified hereinafter as wet sludge cake. As noted, this material contains about 80% water.

Wet sludge cake from storage bin 12 and dried sludge from recycle bin 14 are then routed by conveyor to pug mill 16. Wet sludge cake and dried sludge can individually be conveyed by auger or the like, the mixture in the pug mill cannot. Accordingly, as soon as the product is mixed in the pug mill 16 it enters the dryer 18 wherein heat is supplied by a conventional furnace 20 or the like. As will be obvious to those skilled in the art, the furnace may be supplemented by burning wood chips, sludge pellets or the like.

Dryer 18 is preferably a triple pass rotary dryer heated at the entrance to about 800° F. The mixture is intended to travel the length of the dryer, make a 180° turn and travel the length two more times before exiting the dryer. While several different types of rotary dryers could be utilized, it is preferred to use the rotary dryer described in U.S. Pat. No. 4,558,525.

Pelletized sludge together with the dryer off-gas exit the dryer 18 and enter a separator can 24. The temperature of this stream is about 180° F. The separator can 24 is a vertically disposed cyclone type separator that uses gravity and centrifugal force to remove about 80 to 90% of the solids from the gas stream. The gas stream then exits the separator into a cyclone 26 wherein the fines are removed and the fines then exit the cyclone 26 at exit port 28 and are added to the recycle bin 14.

Cyclone 26 could be a conventional cyclone system but it is preferred to use the separator described in U.S. Pat. No. 4,357,152 for more efficient removal of the solids from the gas stream. Solids from separator 24 then enter a screen system 30.

Preferably, screen system 30 is a rotary screen which also acts as a cooler. In the preferred embodiment of this invention ⅛ inch and 3/32 inch screens are provided. Material larger in diameter than ⅛ inch is classified as oversized. Particles in diameter between ⅛ inch and 3/32 inch are the product and are routed to product bin 32. The oversized particles are then routed to a conventional crusher 34 which may be a roller or the like. The crushed particles are then routed to recycle bin 14. The fines passing through the 3/32 inch screen then exit the screen and are also routed to the recycle bin. If more recycle material is needed, obviously product from product bin 32 can be utilized.

Finally, the air stream exhausted from cyclone 26 passes preferably through a scrubber 36 and a packed tower 38. In my parent patent, the output from packed tower 38 then passes through a chemical tower before being exhausted to the atmosphere. However, according to the process of this invention, the output from the packed tower 38 is passed to a condenser 39 wherein outside air is used to lower the temperature of the gases to condense water therein. The output from condenser 39 then is fed to afterburner 41 where it is burned. The output from burner 41 then passes to heat exchanger 43 where outside air from the condenser 39 is heated and the afterburner off-gas is eventually released to the atmosphere by a stack 42. The heated outside air is then ducted via conduit 45 from heat exchanger 43 to furnace 20 for use as combustion air. As noted above, the heated air in conduit 45 should be about 800° F.

During normal operation the product pellets have an optimum size of about ⅛ inch and constitute about 10% of the solids passing through the system.

As previously indicated the entrance temperature at the rotary dryer is about 800° F. The temperature of the air stream exiting the dryer is about 180° F. After cooling in the rotary cooler screen system 30 the recycle materials in the recycle bin are at a temperature of about 140°.

Figure 2:
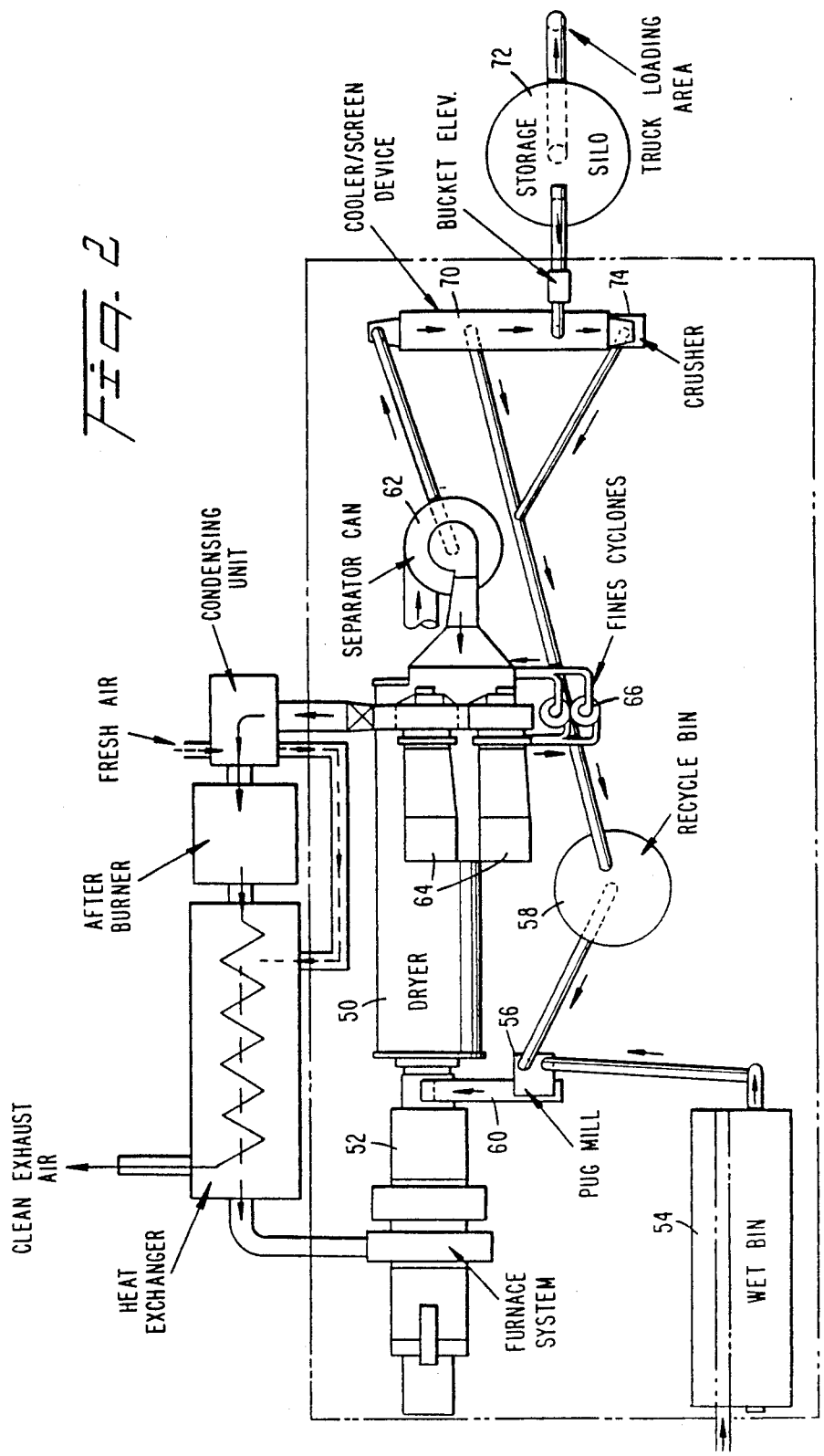
FIG. 2 is a schematic of a preferred version of the system of this invention.

With attention to FIG. 2, FIG. 2 represents a slight modification of the system of FIG. 1. The source of heat for dryer 50 is a conventional furnace 52 which utilizes conventional fuel such as oil. Wet sludge cake from storage bin 54 is routed to a first pug mill 56 wherein the wet cake is mixed with dried pellets from the recycle bin 58. The mixture from mill 56 then drops into a second pug mill 60 and makes a 90° turn as shown to promote mixing.

The mixture then enters drier 50 in front of the outlet from furnace 52. Dryer 50 is preferably a triple pass dryer as described above and shown in U.S. Pat. No. 4,558,525. After passing through the dryer the stream including solids enters separator can 62.

As described above, separator can 62 is a low velocity cyclone type separator. A commercial version may be obtained from Progressive Development Incorporated of Milwaukee, Wis. The air and fines from separator can 62 then enter either a pair or a single cyclone type separator 64 which are preferably the devices described and claimed in U.S. Pat. No. 4,357,152. The fines from cyclone 64 are routed from additional cyclone separators 66 to the recycled bin and the air stream returned to cyclone 64. The air stream exiting cyclone 64 in my parent Patent was treated in an odor control tower of conventional design before being exhausted to the atmosphere.

However, in this case, the air from cyclones 64 is fed into a condenser unit 65 wherein it is cooled to remove water therefrom against a fresh air stream via entrance conduit 67. The output from condenser unit 65 is then fed into an afterburner 69 where it is burned to eliminate volatile hydrocarbons odors and the like. The output from afterburner 69 is at a temperature of about 1400° F. and is fed into a heat exchanger 71. In heat exchanger 71 outside air via conduit 73 is heated and the output gas from the afterburner is ultimately exhausted to the atmosphere through stack 42. The heated outside air then is fed via conduit 75 to furnace 52 for use as combustion air. As noted above the air entering via conduit 75 to furnace 52 should be at about 800° F.

The solids from separator can 62 are routed to a cooler screening device 70. Preferably, as described above, there are two screens in the cooler separator device. The first screen in this version separates out particles less than 3/32 inch in diameter and these particles are routed directly to the recycle bin 58. The second screen separates the product which has a diameter preferably of between ⅛ inch and 3/32 and that product is routed to storage 72 for eventual sale.

The oversized particles remaining then enter the crusher 74 and are eventually rerouted to the recycle bin 58 for recycling through the pug mills 56 and 60 to dryer 50 with the wet sludge cake.

In summary then an expensive chemical tower installation has been eliminated and replaced by an afterburner in the sludge pelletizing process of this invention. The afterburner destroys the volatile hydrocarbons and malodorous gases. Heat from the afterburner off-gases is used to heat combustion air for the furnace system used in the drier. As noted above, the gases exiting the afterburner will have some water removed but are quite humid. In addition, the gases are oxygen depleted. Accordingly, if a portion of the off-gas from the afterburner is returned to the furnace system, there will be a reduction in the oxygen feed to the dryer which will cut down on the oxides formed during the drying process.

The process of this invention then produces sludge pellets of uniform size for use as a soil conditioner and the like and produces by-product off-gases which may be released to the atmosphere without violating emission requirements.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

I claim:

1. A process for drying mechanically dewatered sewage sludge to produce pellets of a predetermined small and uniform size comprising the steps of:

mixing said sludge with recycled, previously dried sludge particles and pellets;

drying said mixture in a thermal drier to form pellets and particles thereof;

conveying the dried pellets and particles and dryer off-gas to a low velocity gas/solids separator and separating and collecting the pellets and a substantial portion of the particles;

clarifying the collected pellets and particles and separating and collecting the pellets of a predetermined size, from the undersized pellets and particles and the oversized pellets and collecting the undersized pellets and particles and the oversized pellets for recycling;

mechanically crushing the recycle materials and collecting the crushed pellets and particles;

recycling the collected pellets and particles by mixing said recycled materials with said incoming sludge to the dryer;

collecting the off-gas from the gas/solids separator and removing substantially all of the fines therefrom;

condensing at least a portion of the water vapor contained therein;

and burning said gases to remove impurities therein before releasing said gases into the atmosphere.

2. The process of claim 1 further comprising cooling said gases to condense the water vapor therein with fresh air.

3. The process of claim 2 further comprising collecting the off-gas from the afterburner and passing said off-gas through a heat exchanger against fresh air;

and collecting said heated fresh air for use as combustion air in said thermal drier.

4. The process of claim 3 wherein the fresh air heated in said heat exchanger is the output air from said condenser.

5. The process of claim 1 wherein the thermal dryer is a rotary dryer.

6. The process of claim 4 wherein the entrance temperature at said dryer is about 800° F.

7. The process of claim 1 wherein the step of clarifying further comprises cooling said collected pellets and particles.

8. The process of claim 1 wherein the step of separating further comprises separating about 85 to 90% of the solids in said separator exiting said dryer.

9. An apparatus for drying mechanically dewatered sewage sludge to produce pellets of a predetermined small and uniform size comprising:

means for mixing said sludge with recycled, previously dried sludge particles and pellets;

thermal drying means downstream of said mixing means for receiving said mixture and drying said mixture to form pellets and particles thereof;

gas/solids separator means downstream of drying means for receiving the dried pellets and particles and off-gas and separating a substantial portion of said particles and pellets;

clarifying means downstream of said separator for receiving said separated particles and pellets and separating the particles of predetermined size from the undersized pellets and particles and the oversized pellets and collecting the undersized pellets and particles and the oversized pellets for recycling;

mechanical crushing means downstream of said clarifying means for receiving and mechanically crushing the recycle materials;

storage bin means and conveying means for conveying the crushed pellets and particles from the clarifying means into the storage bin means whereby the contents of said storage bin means may be recycled by mixing the same with incoming dewatered sludge to be admitted to said drying means;

cyclone means coupled to said gas/solids separator means for receiving the off-gas therefrom and for separating substantially all remaining solids therefrom and conveying means for conveying said separated solids to said storage bin means for recycling;

condenser means coupled to said cyclone means for receiving the off-gas therefrom and for condensing at least a portion of the water vapor therein; and afterburner means coupled to said cyclone means for receiving the off-gas therefrom and for burning said off-gas to remove impurities therein.

10. The apparatus of claim 9 wherein said condenser means includes means for cooling said off-gas with outside, fresh air.

11. The process of claim 10 further comprising heat exchanger coupled to the output of said afterburner for receiving off-gas from said afterburner and for heating fresh outside air therewith for use in said thermal drying means.

12. The process of claim 11 further comprising circulating means for circulating fresh outside air through said condenser, and through said heat exchanger and for circulating said heated outside air to said thermal drying means.

13. The apparatus of claim 9 wherein said thermal drying means includes a rotary dryer.

14. The apparatus of claim 9 wherein said clarifying means further comprises means for separating pellets between ⅛ inch and 3/32 in diameter, means for separating pellets and particles having diameters of less than 3/32 inch and means for separating oversize pellets having diameters of greater than ⅛ inch.

15. The apparatus of claim 9 wherein said clarifying means further includes cooling means for cooling said collected pellets and particles.

16. The apparatus of claim 9 wherein said thermal drying means provides an inlet temperature of about 800° F.

17. The apparatus of claim 9 wherein said clarifying means is adapted to separate and collect pellets of a diameter of about 4-5 millimeters.

* * * * *